United States Patent
Wan et al.

(10) Patent No.: US 12,067,430 B2
(45) Date of Patent: Aug. 20, 2024

(54) ADAPTIVE IDLE DETECTION IN A SOFTWARE-DEFINED DATA CENTER IN A HYPER-CONVERGED INFRASTRUCTURE

(71) Applicant: VMware, Inc., Palo Alto, CA (US)

(72) Inventors: Jiushi Wan, Shanghai (CN); Jin Feng, Shanghai (CN); Zhou Huang, Shanghai (CN); Jian Zhao, Shanghai (CN); Yang Yang, Shanghai (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/468,701

(22) Filed: Sep. 8, 2021

(65) Prior Publication Data

US 2023/0039875 A1    Feb. 9, 2023

(30) Foreign Application Priority Data

Jul. 22, 2021  (WO) ................ PCT/CN2021/107822

(51) Int. Cl.
G06F 3/00    (2006.01)
G06F 9/50    (2006.01)
G06F 9/54    (2006.01)

(52) U.S. Cl.
CPC ............ G06F 9/542 (2013.01); G06F 9/5005 (2013.01)

(58) Field of Classification Search
CPC .................................................. G06F 9/542
USPC ........................................................ 719/310
See application file for complete search history.

(56) References Cited

U.S. PATENT DOCUMENTS

| 10,834,182 | B2 | 11/2020 | Hwang et al. | |
| 11,246,071 | B2* | 2/2022 | Faye | H04W 36/00837 |
| 2005/0122987 | A1* | 6/2005 | Ignatowski | H04L 49/90 370/412 |
| 2005/0149940 | A1* | 7/2005 | Calinescu | G06F 9/5061 718/104 |
| 2008/0021988 | A1* | 1/2008 | Abernethy | H04L 67/1012 709/224 |
| 2010/0153590 | A1* | 6/2010 | Hsin | H04L 49/9063 710/22 |
| 2010/0250158 | A1* | 9/2010 | McElfresh | G01R 31/2853 702/179 |

(Continued)

FOREIGN PATENT DOCUMENTS

| CN | 113886086 | A | * | 1/2022 | |
| EP | 3118781 | A1 | * | 1/2017 | G06F 9/44505 |
| JP | 2009151375 | A | * | 7/2009 | |

OTHER PUBLICATIONS

Faraz Ahmad, Joint Optimization of Idle and Cooling Power in Data Centers While Maintaining Response Time. (Year: 2010).*

(Continued)

*Primary Examiner* — Lechi Truong
(74) *Attorney, Agent, or Firm* — King Intellectual Asset Management

(57) ABSTRACT

An adaptive idle detection method determines whether software defined data centers (SDDCs) in a hyperconverged infrastructure (HCI) environment are idle. Idleness may be quantified via a coefficient of variation (CV) against resource usage, so as to adapt the idle detection method to SDDCs with different hardware specifications and workloads. Management overhead may also be filtered out by the idle detection method, and the idle detection method may use idleness scores to further reduce overhead.

21 Claims, 5 Drawing Sheets

(56) References Cited

U.S. PATENT DOCUMENTS

| | | | | |
|---|---|---|---|---|
| 2010/0312408 | A1* | 12/2010 | Barisione | F02C 9/28 |
| | | | | 700/287 |
| 2010/0325252 | A1* | 12/2010 | Stuhlmeyer | H04L 67/562 |
| | | | | 709/222 |
| 2016/0335111 | A1* | 11/2016 | Bruun | H04L 41/50 |
| 2018/0288143 | A1* | 10/2018 | Hwang | H04L 43/20 |
| 2019/0286215 | A1* | 9/2019 | Paul | F24F 11/62 |
| 2019/0317873 | A1 | 10/2019 | Gopisetti et al. | |

OTHER PUBLICATIONS

A. Manju., M.E, Desktop Viewer Solution for Mobile Computing Using Virtual Network Computing. (Year: 2012).*

Jaeyoun Kim, Adaptive Event Synchronization Control for Distributed Virtual Environment. (Year: 2005).*

K. Tateno, Automatic detection of atrial fibrillation using the coefficient of variation and density histograms of RR and ARR intervals . (Year: 2001).*

"Hyper-converged infrastructure," Wikipedia, available at <URL: https://en.wikipedia.org/wiki/Hyper-converged_infrastructure>, edited Mar. 12, 2021, 3 pages.

VMWare, Inc., "vRealize Operations", available at <URL: vmware.com/content/vmware/vmware-published-sites/us/products/vrealize-operations.html.html>, copyright 2021, 7 pages.

"Coefficient of variation," Wikipedia, available at <URL: https://en.wikipedia.org/wiki/Coefficient_of_variation>, edited May 18, 2021, 9 pages.

* cited by examiner

ADAPTIVE IDLE DETECTION IN A SOFTWARE-DEFINED DATA CENTER IN A HYPER-CONVERGED INFRASTRUCTURE

CROSS-REFERENCE TO RELATED APPLICATION

The present application claims the benefit of Patent Cooperation Treaty (PCT) Application No. PCT/CN2021/107822, filed Jul. 22, 2021, which is incorporated herein by reference.

BACKGROUND

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

One type of virtualized computing environment that can implement SDDCs is a hyperconverged infrastructure (HCI) environment, which combines elements of a traditional data center: storage, compute, networking, and management functionality. In a HCI environment, a SDDC can be provisioned on-demand for a specific task, for use in a few hours or other finite amount of time.

For example, customers or other users may provision a SDDC to do ad-hoc testing or for some other proof-of-concept task. After the task is done, the SDDC may be forgotten but still remains (as an idle SDDC) in the infrastructure. As another example, there may be burst requests or other condition(s) that require scaling up of SDDCs. Afterwards, the workload becomes much smaller and some SDDCs could be idle. The customers may not notice that there are unused SDDCs until they receive a bill, thereby causing unnecessary cost for the customers.

If there is a detection and alert mechanism in place to proactively notify the customers that they have unused/idle SDDCs, then the customers can benefit from this mechanism. However, current detecting systems suffer from inaccuracy, inefficiency, and other problems.

DETAILED DESCRIPTION

Figure 1:
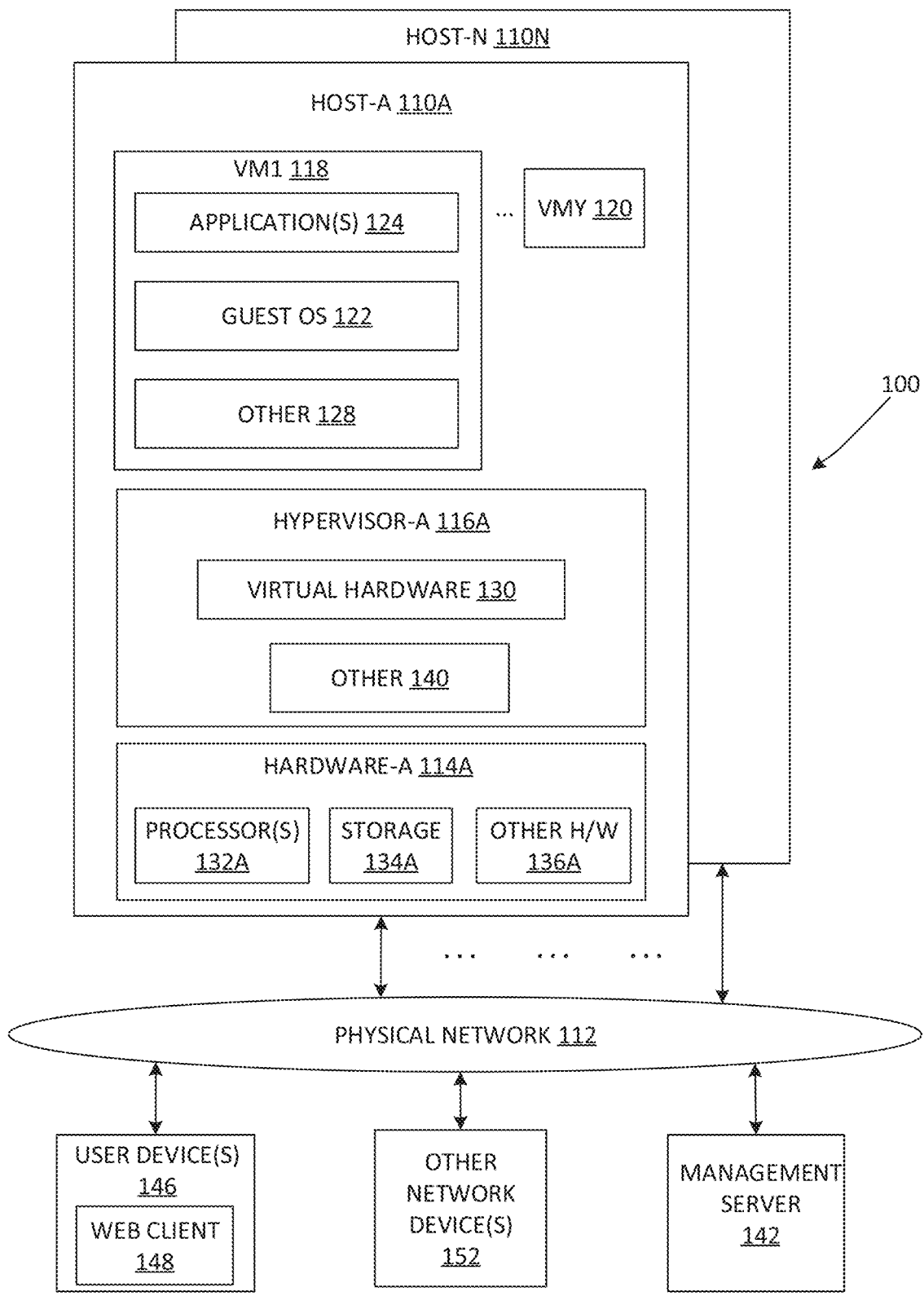
FIG. 1 is a schematic diagram illustrating an example virtualized computing environment that can implement idle detection for software-defined data centers (SDDCs)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

The present disclosure addresses the drawbacks of current idle detection techniques used in virtualized computing environments.

For example, some current idle detection techniques use absolute resource utilization as a threshold to determine idleness. For instance, a compute threshold utilization (e.g., 100 MHz CPU, 20 input/output (I/O) operations of a disk I/O, 1 Kbps of a network I/O, etc.) may be configured for detecting idle machines. However, most workloads do not follow a straight line for utilization. There can be various peaks in utilization over time. Hence, an absolute CPU or network utilization is inaccurate for characterizing the idleness. This results in current idle detection techniques (which operate based on absolute resource utilization thresholds) being error prone.

As another example, some current idle detection techniques do not take management overhead in a HCI environment into account. In a software-defined HCI system, a cluster of machines are orchestrated via a control plane, which contributes to the management overhead of the HCI system. However, current idle detection techniques do not discriminate this management overhead from the usage data that is more relevant to idleness determination, thereby leading to inaccurate idleness detection results. With idleness detection, the intrinsic management overhead should be characterized as noise that should be filtered out.

As still another example, current idle detection systems exert additional overhead on the production environment (e.g., the deployed HCI environment having SDDCs). In a HCI system, the idle detection system is usually located in the control plane, thereby consuming computing resources. While performing idleness detection, resource utilization may be retrieved from a HCI system at regular intervals. This impacts the HCI system considerably if there are many SDDCs in the HCI system.

The embodiments of an idle detection method/system described herein address the above and other drawbacks/problems with current idle detection techniques. According to one aspect, an adaptive idle detection algorithm is provided, wherein system idleness is quantified via a coefficient of variation (CV) against the resource usage, and so a compute threshold is not required to detect an idle system. With the characteristic of CV, the idle detection algorithm can adapt to SDDCs with different hardware specifications and workloads.

According to another aspect, more accurate detection of idleness is provided in which the idle detection algorithm defines a relative metric (e.g., CV) to identify an idle system, and the intrinsic management overhead in a HCI environment is taken into account (e.g., identified and filtered out). A result is improved accuracy in the idleness detection.

According to still another aspect, more lightweight detecting is possible. This may be accomplished through the use of an idleness score, which enables reduction/avoidance of unnecessary and/or frequent retrieval of statistical information from a database. Considerable savings in management costs thus become possible in a large scale HCI environment.

Computing Environment

Various implementations will now be explained in more detail using FIG. 1, which is a schematic diagram illustrating an example virtualized computing environment 100 that can implement idle detection for software-defined data centers (SDDCs). More specifically, FIG. 1 is a schematic diagram illustrating an example virtualized computing environment 100 having a plurality of hosts that may belong to one or more SDDCs, wherein idleness of the SDDCs can be detected. Depending on the desired implementation, the virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMY 120, wherein Y (as well as N) is an integer greater than or equal to 1. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 are shown and described herein.

VM1 118 may include a guest operating system (OS) 122 and one or more guest applications 124 (and their corresponding processes) that run on top of the guest operating system 122. VM1 118 may include still further other elements generally depicted at 128, such as a virtual disk, agents, engines, modules, and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs.

The hypervisor-A 116A may include or may operate in cooperation with still further other elements residing at the host-A 110A. Such other elements (generally depicted at 140) may include drivers, agent(s), daemons, engines, virtual switches, and other types of modules/units/components that operate to support the functions of the host-A 110A and its VMs. One of such other elements 140 of the hypervisor-A 116A may be configured, for example, to collect and report host statistics (e.g., CPU usage, network usage, disk usage, etc.) to an external network device.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

A management server 142 or other management entity of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs (e.g., directly from the hosts and/or indirectly from the host via other network device(s) that receive usage data from the hosts), to configure and provision VMs, to activate or shut down VMs, to monitor health conditions and diagnose and remedy operational issues that pertain to health, and to perform other managerial tasks associated with the operation and use of the various elements in the virtualized computing environment 100.

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, distributed storage system 152, etc.) via the physical network 112. The host-A 110A . . . host-N 110N may in turn be configured as a data center (e.g., a SDDC) that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMY 120 (including operating the applications 124), using a web client 148. The user device 146 can be in the form of a computer, including desktop computers and portable computers (such as laptops and smart phones). In one embodiment, the user may be an end user or other consumer that uses services/components of VMs (e.g., the application 124)

and/or the functionality of the SDDC. The user may also be a system administrator that uses the web client 148 of the user device 146 to remotely communicate with the management server 142 via a management console for purposes of performing management operations.

Depending on various implementations, one or more of the physical network 112, the management server 142, the user device(s) 146, or other network device(s) 152 can comprise parts of the virtualized computing environment 100, or one or more of these elements can be external to the virtualized computing environment 100 and configured to be communicatively coupled to the virtualized computing environment 100.

For instance, the other network devices 152 of some implementations may include one or more servers that run an idle detection algorithm and/or a policy-based action module. In other implementations, the idle detection algorithm and/or the policy-based action module may reside in the management server 142, alternatively or in addition to the other network devices 152. Details of the idle detection algorithm and the policy-based action module will be provided below. The other network devices 152 and/or the management server 142 may also include or may be communicatively coupled to (for access) a usage statistics database that stores usage data reported by the hosts of one or more SDDCs.

Idle Detection System

Figure 2:
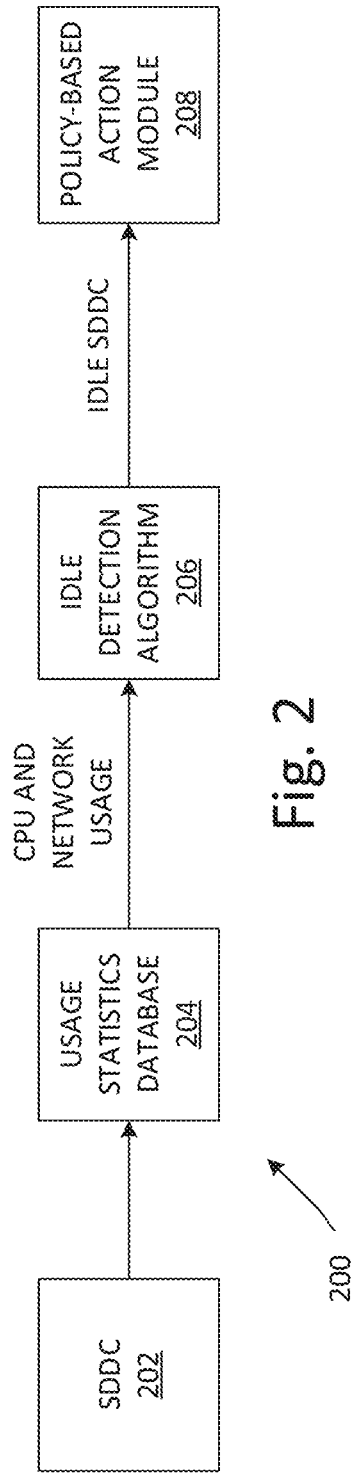
FIG. 2 is a schematic diagram illustrating a system that operates to provide idle detection of SDDCs for the virtualized computing environment of FIG. 1.

FIG. 2 is a schematic diagram illustrating a system 200 that operates to provide idle detection of SDDCs for the virtualized computing environment 100 of FIG. 1. For example and as explained previously above, at least some of the components of the system 200 may reside in the other network devices 152 and/or at the management server 142.

In FIG. 2, one or more SDDCs 202 reports its usage data to a usage statistics database 204. For example, a SDDC 202 may be comprised of a cluster of hosts, which are orchestrated/managed by the management server 142. The SDDC 202 collects usage data from each of its hosts at intervals and stores the usage data in the usage statistics database 204. Examples of usage data may include CPU usage, network usage, disk usage, etc. Hereinafter and for the sake of explanation, the operation of the idle detection algorithm will be described in the context of CPU and network usage, and it is understood that other types of resource usage data may be collected and stored for idleness detection purposes.

When an idle detection algorithm 206 is executed, the idle detection algorithm 206 retrieves CPU and network usage data (samples) from the usage statistics database 204. If the idle detection algorithm 206 determines that the SDDC 202 is idle, an event is triggered in a policy-based action module 208, so that a policy-based action module 208 can perform or cause performance of an action, such as notifying a system administrator to enable the system administrator to perform remediation or other action, disabling the idle SDDC, removing the idle SDDC from the software-defined HCI system (including auto-scaling the HCI system), repurposing and activating the idle SDDC for some other task, etc.

Idle Detection Algorithm

Figure 3:
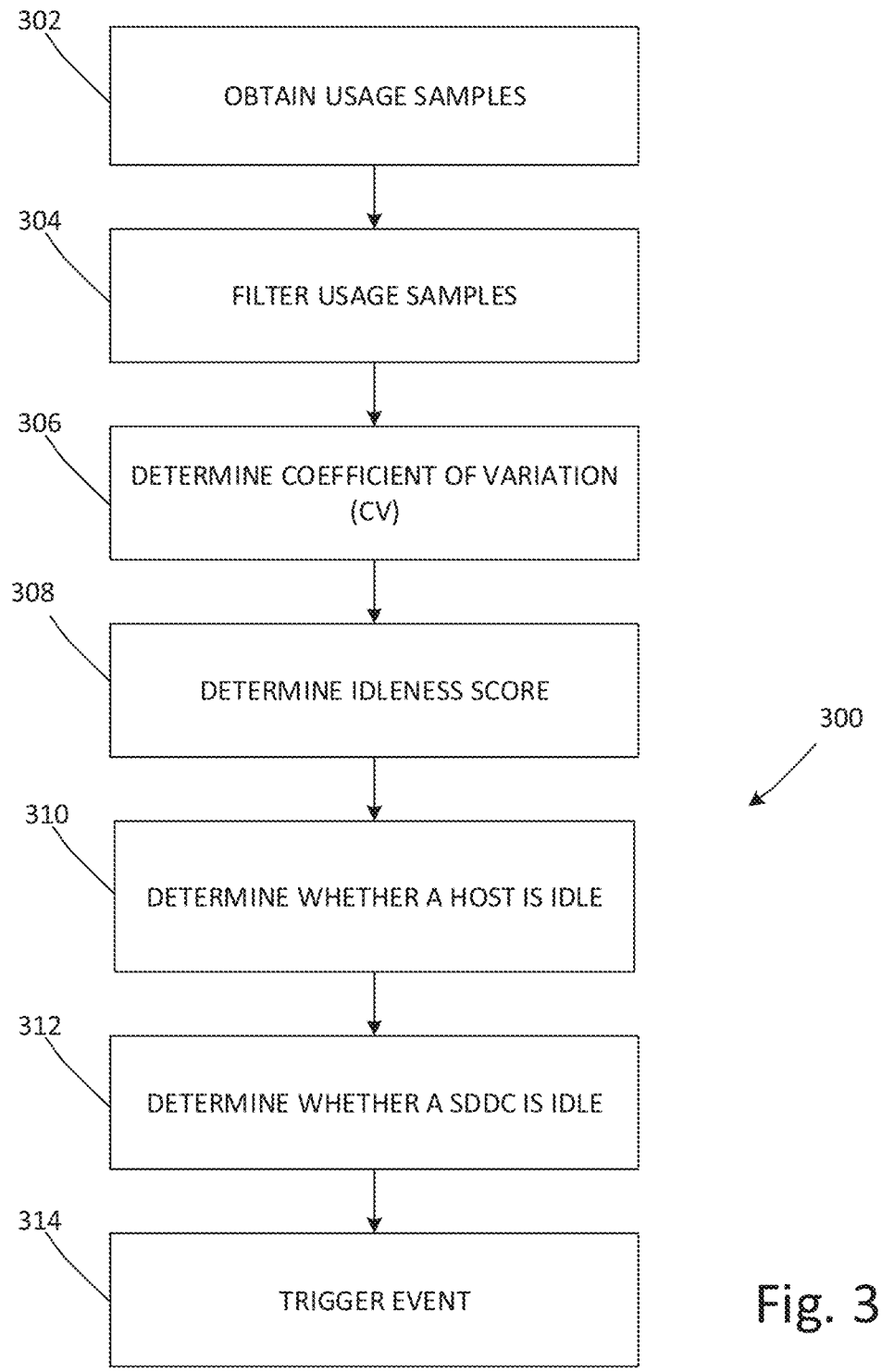
FIG. 3 is a flowchart of an example idle detection method that can be performed by the system of FIG. 2.

FIG. 3 is a flowchart of an example idle detection method 300 that can be performed by the system 200 of FIG. 2. For instance, the method 300 may be embodied by the idle detection algorithm 206 of FIG. 2, which may be performed by the network device 152, the management server 142, and/or by components thereof. For purposes of explanation, the method 300 will be described herein in the context of the network device 152 performing the idle detection algorithm 206.

The example method 300 may include one or more operations, functions, or actions illustrated by one or more blocks, such as blocks 302 to 314. The various blocks of the method 300 and/or of any other process(es)/method(s) described herein may be combined into fewer blocks, divided into additional blocks, supplemented with further blocks, and/or eliminated based upon the desired implementation. In one embodiment, the operations of the method 300 and/or of any other process(es)/method(s) described herein may be performed in a pipelined sequential manner. In other embodiments, some operations may be performed out-of-order, in parallel, etc.

The method 300 may begin at a block 302 ("OBTAIN USAGE SAMPLES"), wherein the network device 152 obtains usage samples from the usage statistics database 200 and/or obtains the usage samples from some other source (e.g., from the hosts directly, etc.). The usage samples may comprise, for example, CPU and network usage data or other type of resource usage samples.

Figure 4:
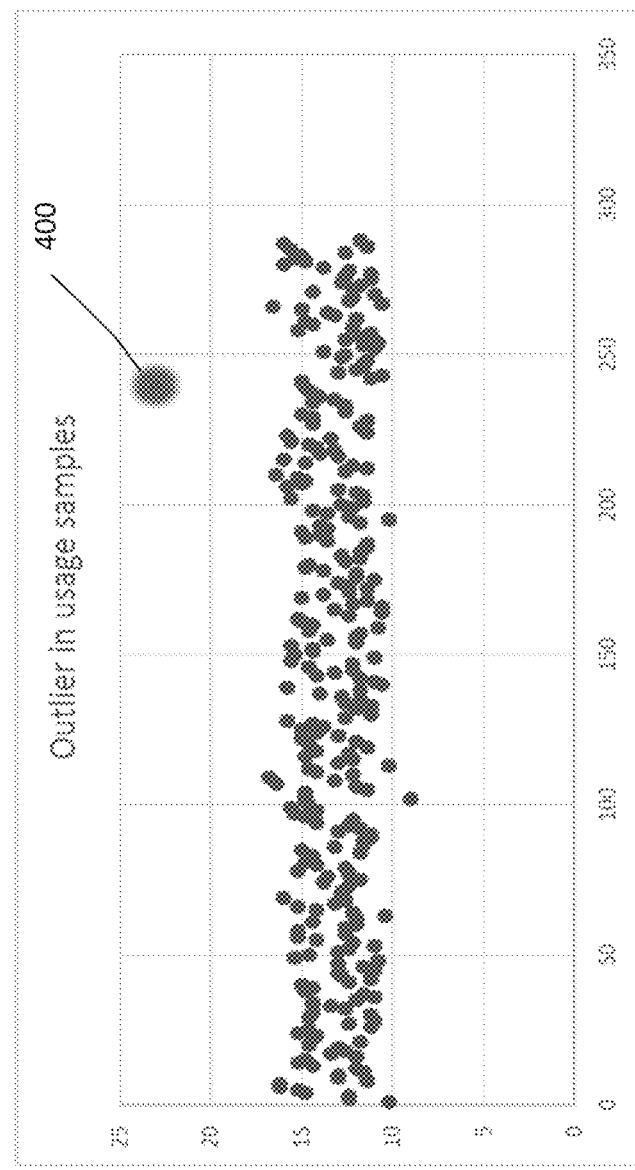
FIG. 4 is an example plot of usage samples showing an outlier.

At a block 304 ("FILTER USAGE SAMPLES"), the network device 152 filters the samples to remove outliers. For instance, samples that have deviated too far from a mean value may be regarded as an outlier. FIG. 4 is an example plot of usage samples showing an outlier 400. In FIG. 4, the values (vertical axis) of usage samples are plotted over time (horizontal axis). One or more outliers 400 are filtered out at the block 304.

The outlier(s) 400 in the usage samples should be removed before calculating/determining idleness, since the outlier is the result of management overhead in the SDDC 202. For instance, heartbeat messages between the hosts and management server 142 contribute to the overhead, and such overhead is regarded as noise for the idleness calculation. Removing the outlier 400 enables the idle detection algorithm 206 to be converged more easily.

The following equations describe the filtering of the outlier(s) 400 at the block 304:

$$\text{Outliers} = \{s_i | s_i \in S, \ s_i \geq \mu + 5\sigma\},$$

where $$\mu = \frac{1}{n}\sum_{i=1}^{n} s_i,$$

$$\sigma = \sqrt{\frac{1}{n}\sum_{i=1}^{n}(s_i - \mu)^2}$$

In the foregoing equations, s is a value of a usage sample; p is a mean sample value; a is a standard deviation; and n is a number of usage samples in a sample set.

At a block 306 ("DETERMINE COEFFICIENT OF VARIATION (CV)"), the network device 152 determines the CV for the usage samples from each host in the SDDC 202. More specifically, an idle SDDC can be identified based on its CPU and network usage pattern. Since SDDCs may have different hardware specifications and workloads, the absolute CPU or network usage thresholds used by some current techniques do not accurately describe/represent the idleness. When an SDDC is idle, its CPU or network usage should have smaller fluctuations compared to SDDCs that are in use.

Accordingly, a CV may be defined/determined at the block 306 to describe the fluctuation of the usage, which can quantify the idleness. The following example equations may be used to calculate a CV:

$$CV = \frac{STDEV(x)}{AVERAGE(x)}, \text{ where } x \text{ is usage samples,}$$

$$STDEV(x) = \sqrt{\frac{1}{n}\sum_{i=1}^{n}(x_i - \mu)^2}$$

As will be described later below, the idleness may be calculated based on the latest usage samples (e.g., the last 16 hours of samples or other time frame), having taken the CV into account. When the calculated idleness is below a threshold, the SDDC can be classified as idle.

At a block 308 ("DETERMINE IDLENESS SCORE"), the network device 152 calculates, for each host in the SDDC, an idleness score from usage samples of the host. As previously explained above, an idle detection system itself contributes to the overhead when retrievals from the usage statistics database 204 are performed.

Therefore, an idleness score is defined/calculated for each host so as to minimize/reduce the idle detection algorithm's 206 overhead against the usage statistics database 204. The idleness score depicts how long one host has been idle up to now. The idle detection algorithm 206 calculates and maintains an idleness score for each host in the SDDC 202. When the idleness score does not meet a candidate score, then idle detection algorithm 206 will not perform further idleness detection of the SDDC 202. The candidate score is an idleness score above which the SDDC is qualified to have idleness detection performed on it.

The following is an example of a methodology/algorithm that may be performed at the block 308 to calculate an idleness score of a host from resource (e.g., CPU or network) usage samples:

---

INPUT:
samples: a list of samples, $\{s_1, s_2, \ldots, s_n\}$, which may be sorted by ascending time, for example $s_1$ is older than $s_2$
fluctuation_threshold: a tunable, well-trained value in a hyper-converged system, for example 15%
OUTPUT: score 1. $\mu \leftarrow \frac{1}{n}\sum_{i=1}^{n} s_i$ 2. $\sigma \leftarrow \sqrt{\frac{1}{n}\sum_{i=1}^{n}(s_i - \mu)^2}$ 3. T ← filter(samples, $s_i < \mu + 5\sigma$)
4. n' ← length(T)
5. candidates ← {i |i = 1, 2, . . . , n'; CV($T_i, T_{i+1}, \ldots, T_{n'}$) < fluctuation_threshold}
6. score ← n − min(candidates) + 1
7. RETURN score

---

In the foregoing algorithm (e.g., lines 1 and 2), p is a mean sample value, and σ is a standard deviation of the usage samples, as used throughout herein. T (e.g., line 3) represents the sample set that remains after the outliers are filtered out. n' (e.g., line 4) represents the number of samples in the sample set T. Candidate samples are determined (e.g., line 5) using a CV and are the samples that are less than the fluctuation_threshold. The idleness score of the host is then obtained (e.g., lines 6 and 7) from the candidate samples.

Figure 5:
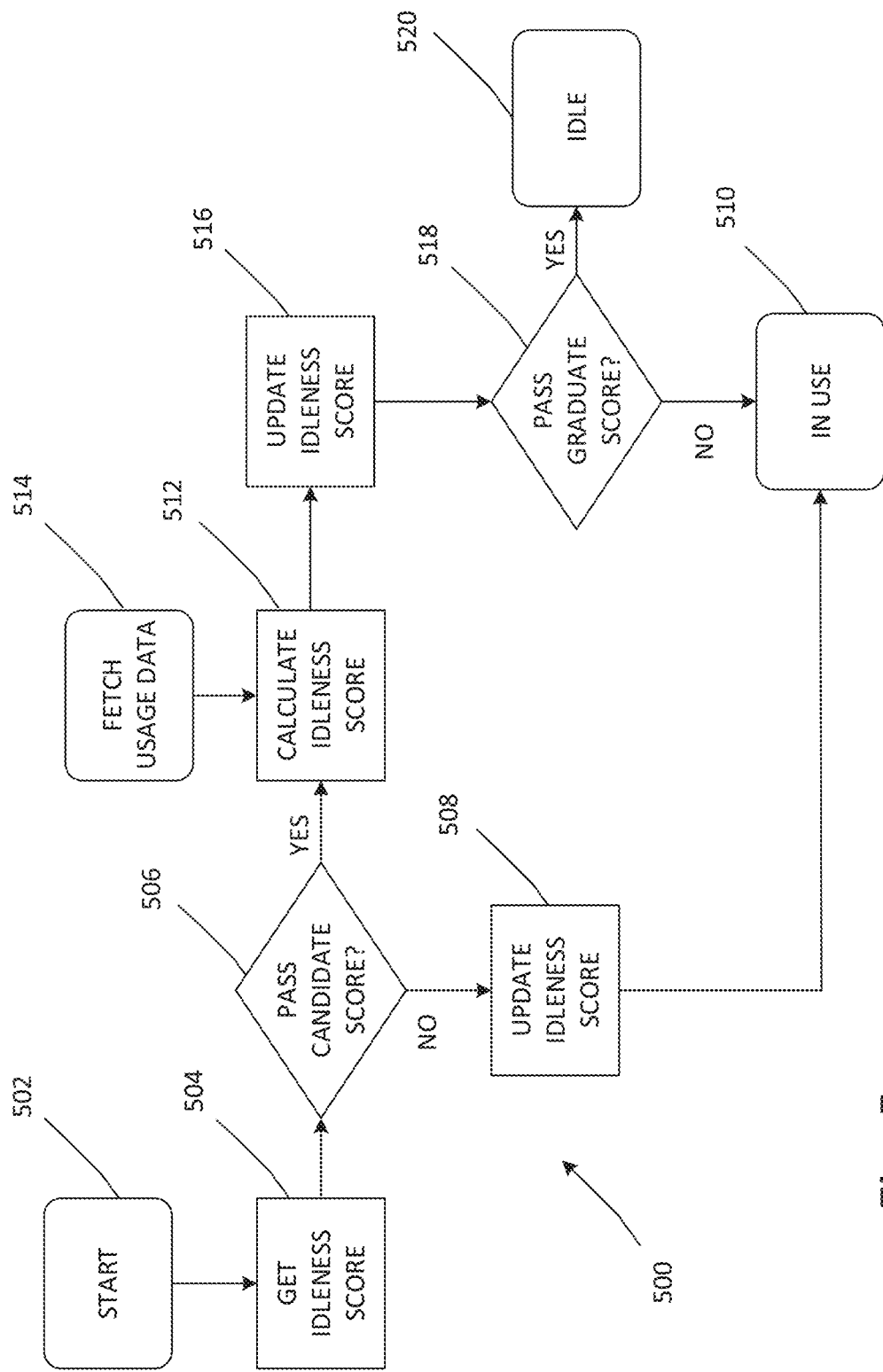
FIG. 5 is a flowchart of an example method to determine whether a host is idle and which may be performed by the system of FIG. 2.

At a block 310 ("DETERMINE WHETHER A HOST IS IDLE"), the network device 152 determines whether a host is idle based at least in part on the idleness score of the host. According to some implementations and as stated previously above, only when the idleness score of a host reaches a defined candidate score can the host be qualified to be detected/evaluated for idleness (else, the host is determined to be in use). If the idleness score of the host meets or exceeds the candidate score, then the idleness score of the host is compared against a graduate score. The graduate score is an idleness score above which the host is considered to be idle. FIG. 5 and the accompanying description below provide further details regarding an example methodology/algorithm to determine/detect whether a host is idle.

At a block 312 ("DETERMINE WHETHER A SDDC IS IDLE"), the network device 152 determines whether the SDDC 202 is idle. As previously explained above, a SDDC is comprised of a cluster of hosts. A resource scheduler may spread workloads across the cluster, and it is sometimes/often the case that not all the hosts are evenly balanced in terms of computing and networking workloads.

Figure 6:
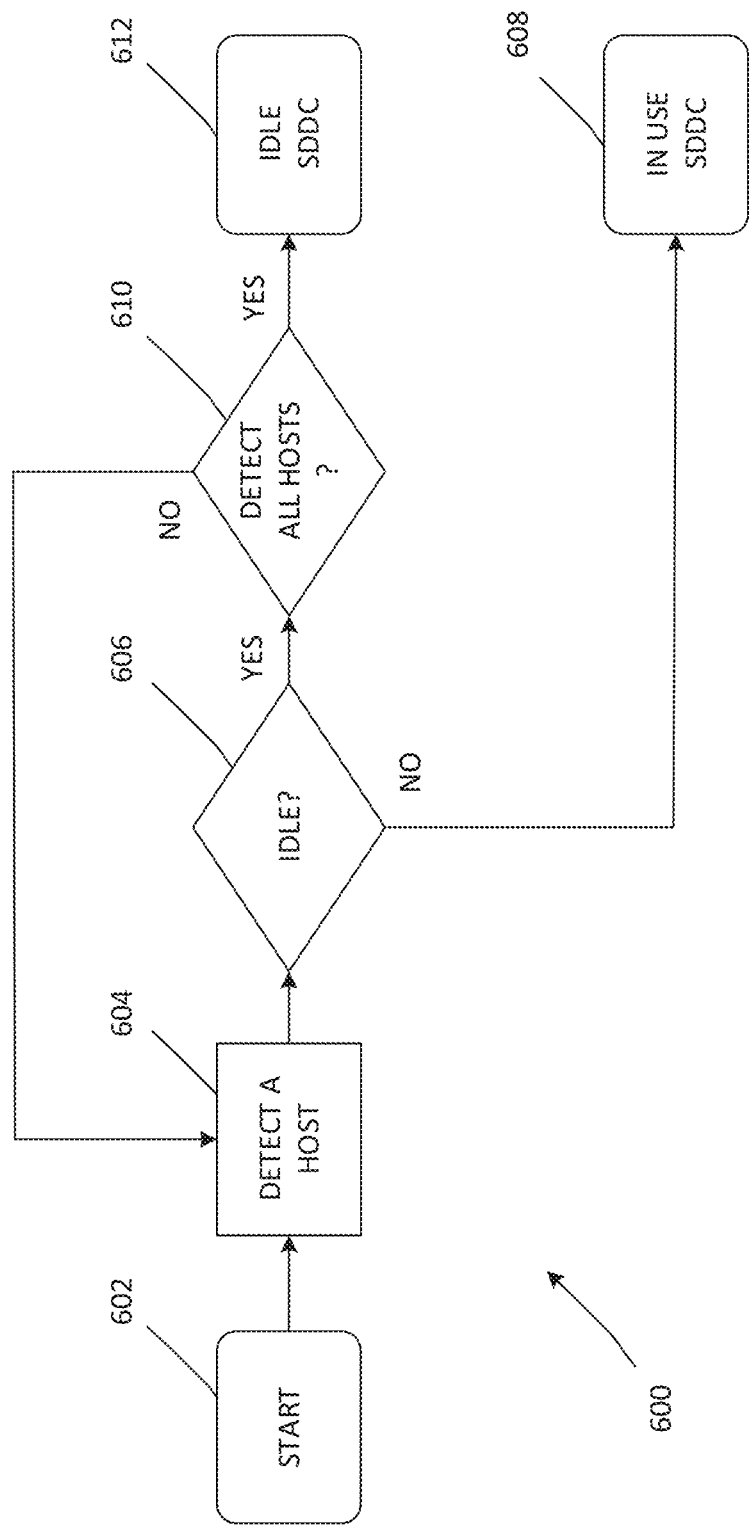
FIG. 6 is a flowchart of an example method to determine whether a SDDC is idle and which may be performed by the system of FIG. 2.

According to various implementations, all hosts in the SDDC 202 may be evaluated to determine their idleness. When all hosts are classified as idle, then SDDC 202 can be labeled as being idle. FIG. 6 and the accompanying description below provide further details regarding an example methodology/algorithm to determine/detect whether a SDDC is idle.

At a block 314 ("TRIGGER EVENT"), wherein the network device 152 triggers an event at the policy-based action module 208, in response to determining at the SDDC 202 is idle. The policy-based action module 208 may then initiate one or more remediation actions, such as alerting a system administrator, deactivating/deleting the idle SDDC, etc.

FIG. 5 is a flowchart of an example method 500 to determine whether a host is idle and which may be performed by the system 200 of FIG. 2. The method 500 starts at a block 502 ("START"), when the network device 152 obtains a current idleness score for the host at a block 504 ("GET IDLENESS SCORE").

Next at a block 506 ("PASS CANDIDATE SCORE?"), the network device 152 determines whether the idleness score meets or exceeds the candidate score. If the idleness score does not pass the candidate score ("NO" at the block 506), then the idleness score is updated at a block 508 ("UPDATE IDLENESS SCORE"), and the host is classified as being in use (not idle) at a block 510 ("IN USE").

If, however, the idleness score passes the candidate score ("YES" at the block 506), then the host is qualified for further evaluation/detection of whether it is idle. At a block 512 ("CALCULATE IDLENESS SCORE"), the network device calculates an updated idleness score of the host using the algorithm/methodology described in blocks 306 and 308 of FIG. 3. For example, CPU and network usage data (samples) may be fetched from the usage statistics database 204, at a block 514 ("FETCH USAGE DATA"). From such samples, filtering, CV calculation, idleness score computation, etc. may be performed at the block 512 in the manner previously described above for blocks 306 and 308.

The idleness score for the host is updated at a block 516 ("UPDATE IDLENESS SCORE") using the idleness score calculated at the block 512. At a block 518 ("PASS GRADUATE SCORE?"), the network device determines whether such idleness score meets or exceeds the graduate score. If the idleness score does not pass the graduate score ("NO" at the block 518), then the host is classified as being in use at the block 510. However, if the idleness score passes the graduate score ("YES" at the block 518), then the host is considered to be idle at a block 520 ("IDLE").

The foregoing operations/steps of the method 500 may be iterated or otherwise repeated for each host in the SDDC 202. If any single host is determined to be in use during the iteration(s), then the SDDC 202 is deemed to be in use (not idle), and so the method 500 need not continue to perform idleness evaluation of a next host, since all hosts need to be idle in order for the SDDC 202 to be considered as being idle.

The following is an example of a methodology/algorithm that may be based at least in part on the foregoing method 500 to determine whether a host is idle:

```
INPUT:
• host: a host to be detected
• sample_interval: an interval at which a sample is collected, for
  example 5 minutes
• span_of_sample: a time span during which a host will be detected,
  for example 960 minutes
• detection_interval: an interval at which a detecting cycle will occur,
  for example 120 minutes
  OUTPUT: is host idle, idleness score
1.  samples ← retrieve_latest_cpu_usage (span_of_sample)
2.  cpuIdlenessScore ← calculate_idleness_score(samples)
3.  samples ← retrieve_latest_network_usage (span_of_sample)
4.  netIdlenessScore ← calculate_idleness_score(samples)
5.  idlenessScore ← min(cpuIdlenessScore, netIdlenessScore)
6.  graduate_score = span_of_sample / sample_interval
7.  candidate_score = (span_of_sample − detection_interval) /
    sample_interval
8.
9.  IF idlenessScore == graduate_score THEN
10.    RETURN true, idlenessScore
11. ELSE
12.    RETURN false, idlenessScore
13. END IF
```

In the foregoing algorithm (e.g., lines 1-4), idleness scores (cpuIdlenessScore and netIdlenessScore) are computed using CPU and network usage samples, and the final idleness score (idlenessScore) is obtained from the smallest of these two idleness scores (e.g., line 5). The graduate and candidate scores are computed (e.g., lines 6 and 7, respectively). The host is determined to be idle (e.g., lines 9 and 10) if the idlenessScore is greater than or equal to the graduate score. Else, the host is determined to be in use (e.g., lines 11 and 12).

FIG. 6 is a flowchart of an example method 600 to determine whether a SDDC is idle and which may be performed by the system 200 of FIG. 2. The method 600 starts at a block 602 ("START"), when the network device 152 detects a host in the SDDC for determination of idleness, at a block 604 ("DETECT A HOST").

At a block 606 ("IDLE?"), the network device 152 determines whether that host is idle. The determination of idleness at the block 606 may be performed, for example, by using the method 500 as provided above with respect to FIG. 5 and the accompanying description.

If the host is determined to be in use ("NO" at the block 606), then the SDDC is classified as being in use (not idle), at a block 608 ("IN USE SDDC"), since at least one host in the SDDC is determined to be in use.

However, if the host is determined to be idle ("YES" at the block 606), then the network device 152 determines whether all hosts in the SDDC have been detected, at a block 610 ("DETECT ALL HOSTS?"). If all hosts have been detected ("YES" at the block 610) and such hosts are all idle, then the SDDC is determined to be idle at a block 612 ("IDLE SDDC").

If all hosts have not been detected ("NO" at the block 610), then the process above repeats starting at the block 604 to detect the next host and to determine whether the next host(s) are in use or idle.

The following is an example of a methodology/algorithm that may be based at least in part on the foregoing method 600 to determine whether a SDDC is idle:

```
INPUT:
• sddc: a SDDC to be detected
• sample_interval: an interval at which a sample is collected, for
  example 5 minutes
• detection_interval: an interval at which a detecting cycle will occur,
  for example 120 minutes
  OUTPUT: is sddc idle
1.  host_idleness_score_map ← EmptyMap
2.  FOR host in sddc
3.    host_idleness_score_map[host] = candidate_score
4.  END FOR
5.  delta_score = detection_interval / sample_interval
6.  FOR host in sddc
7.    idle ← false
8.    idleness_score = host_idleness_score_map[host]
9.    IF idleness_score < candidate_score THEN
10.      host_idleness_score_map[host] = idleness_score +
         delta_score
11.      BREAK FOR
12.    END IF
13.    idle, idleness_score = is_idle(host)
14.    host_idleness_score_map[host] = idleness_score
15.    BREAK FOR if not idle
16. END FOR
17. RETURN idle
```

In the foregoing algorithm (e.g., lines 6-16), the algorithm loops/iterates through the hosts in the SDDC to determine whether a host is idle, and the algorithm exits (e.g., lines 11 or 15) if an in-use host is found, thereby classifying the SDDC as being in use (not idle). If each host is determined to be idle (e.g., line 13), then the output of the algorithm is a classification of the SDDC as being idle (e.g., line 17).

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1 to 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines", it should be understood that a virtual machine running within a host is merely one example of a "virtualized computing instance" or "workload". A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to determine idleness of a cluster of hosts.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to detect idleness of a software-defined data center (SDDC), the method comprising:
    for each host of a plurality of hosts in the SDDC:
        obtaining resource usage samples provided by the host;
        determining a coefficient of variation (CV) associated with fluctuations of the resource usage samples;
        determining an idleness score of the host based at least in part on the usage samples and the CV;
        wherein determining the idleness score of the host comprises:
            determining a first idleness score associated with processor usage by the host;
            determining a second idleness score associated with network usage by the host; and
            determining the idleness score of the host from a smallest of either the first idleness score or the second idleness score; and
        based at least in part on the idleness score, determining that the host is idle;
    determining that the SDDC is idle, in response to determination that all of the hosts of the plurality of hosts are idle; and
    triggering an event to perform a remediation action for the idle SDDC.

2. The method of claim 1, further comprising filtering outlier samples associated with a management overhead, prior to determining the idleness score of the hosts.

3. The method of claim 1, wherein determining that the host is idle includes:
    determining that the idleness score exceeds a candidate score, so as to qualify the host for further determination of idleness; and
    in response to determination that the idleness score exceeds the candidate score, determining that the idleness score exceeds a graduate score, wherein the host is determined to be idle if the idleness score exceeds the graduate score.

4. The method of claim 3, wherein determining that the idleness score exceeds a graduate score comprises:
    fetching resource usage samples from a database;
    and calculating the graduated score using the fetched resource usage samples.

5. The method of claim 1, further comprising determining that the SDDC is in use, in response to determination that at least one host of the plurality of hosts is in use.

6. The method of claim 1, wherein determining the idleness score reduces overhead caused by retrieval of resource usage samples from a usage statistics database.

7. The method of claim 1, further comprising:
    determining that the host is in use, in response to the idleness score of the host being less than a candidate score, wherein the candidate score is calculated based on an interval at which a resource usage sample is collected, a time span during which the host is detected, and an interval at which a detection cycle occurs; and
    determining that the host is in use, in response to the idleness score of the host being less than a graduate score, wherein the graduate score is calculated based on the time span during which the host is detected and the interval at which the resource usage sample is collected.

8. A non-transitory computer-readable medium having instructions stored thereon, which in response to execution by one or more processors, cause the one or more processors of a host to perform or control performance of a method to detect idleness of a software-defined data center (SDDC), wherein the method comprises:
    for each host of a plurality of hosts in the SDDC:
        obtaining resource usage samples provided by the host;
        determining a coefficient of variation (CV) associated with fluctuations of the resource usage samples;

determining an idleness score of the host based at least in part on the usage samples and the CV;
wherein determining the idleness score of the host comprises:
determining a first idleness score associated with processor usage by the host;
determining a second idleness score associated with network usage by the host; and
determining the idleness score of the host from a smallest of either the first idleness score or the second idleness score; and
based at least in part on the idleness score, determining that the host is idle;
determining that the SDDC is idle, in response to determination that all of the hosts of the plurality of hosts are idle; and
triggering an event to perform a remediation action for the idle SDDC.

9. The non-transitory computer-readable medium of claim 8, wherein the method further comprises:
filtering outlier samples associated with a management overhead, prior to determining the idleness score of the hosts.

10. The non-transitory computer-readable medium of claim 8, wherein determining that the host is idle includes:
determining that the idleness score exceeds a candidate score, so as to qualify the host for further determination of idleness; and
in response to determination that the idleness score exceeds the candidate score, determining that the idleness score exceeds a graduate score, wherein the host is determined to be idle if the idleness score exceeds the graduate score.

11. The non-transitory computer-readable medium of claim 10, wherein determining that the idleness score exceeds a graduate score comprises:
fetching resource usage samples from a database;
and calculating the graduated score using the fetched resource usage samples.

12. The non-transitory computer-readable medium of claim 8, wherein the method further comprises:
determining that the SDDC is in use, in response to determination that at least one host of the plurality of hosts is in use.

13. The non-transitory computer-readable medium of claim 8, wherein determining the idleness score reduces overhead caused by retrieval of resource usage samples from a usage statistics database.

14. The non-transitory computer-readable medium of claim 8, wherein the method further comprises:
determining that the host is in use, in response to the idleness score of the host being less than a candidate score, wherein the candidate score is calculated based on an interval at which a resource usage sample is collected, a time span during which the host is detected, and an interval at which a detection cycle occurs; and
determining that the host is in use, in response to the idleness score of the host being less than a graduate score, wherein the graduate score is calculated based on the time span during which the host is detected and the interval at which the resource usage sample is collected.

15. A network device to detect idleness of a software-defined data center (SDDC), the network device comprising:
one or more processors; and
a non-transitory computer-readable medium coupled to the one or more processors, and having instructions stored thereon, which in response to execution by the one or more processors, cause the one or more processors to perform or control performance of operations that include:
for each host of a plurality of hosts in the SDDC:
obtain resource usage samples provided by the host;
determine a coefficient of variation (CV) associated with fluctuations of the resource usage samples;
determine an idleness score of the host based at least in part on the usage samples and the CV;
wherein determining the idleness score of the host comprises:
determining a first idleness score associated with processor usage by the host;
determining a second idleness score associated with network usage by the host; and
determining the idleness score of the host from a smallest of either the first idleness score or the second idleness score; and
based at least in part on the idleness score, determine that the host is idle;
determine that the SDDC is idle, in response to determination that all of the hosts of the plurality of hosts are idle; and
trigger an event to perform a remediation action for the idle SDDC.

16. The network device of claim 15, wherein the operations further include:
filter outlier samples associated with a management overhead, prior to determining the idleness score of the hosts.

17. The network device of claim 15, wherein the operations to determine that the host is idle includes operations to:
determine that the idleness score exceeds a candidate score, so as to qualify the host for further determination of idleness; and
in response to determination that the idleness score exceeds the candidate score, determine that the idleness score exceeds a graduate score, wherein the host is determined to be idle if the idleness score exceeds the graduate score.

18. The network device of claim 15, wherein the operations further include:
determine that the SDDC is in use, in response to determination that at least one host of the plurality of hosts is in use.

19. The network device of claim 15, wherein determination of the idleness score reduces overhead caused by retrieval of resource usage samples from a usage statistics database.

20. The network device of claim 15, wherein the operations further include:
determine that the host is in use, in response to the idleness score of the host being less than a candidate score, wherein the candidate score is calculated based on an interval at which a resource usage sample is collected, a time span during which the host is detected, and an interval at which a detection cycle occurs; and
determine that the host is in use, in response to the idleness score of the host being less than a graduate score, wherein the graduate score is calculated based on the time span during which the host is detected and the interval at which the resource usage sample is collected.

21. The network device of claim 15, wherein determining that the idleness score exceeds a graduate score comprises:
fetching resource usage samples from a database;

and calculating the graduated score using the fetched resource usage samples.

* * * * *